United States Patent
Perrin et al.

(10) Patent No.: US 10,345,899 B2
(45) Date of Patent: Jul. 9, 2019

(54) METHOD FOR ADAPTING THE SENSORIAL OUTPUT MODE OF A SENSORIAL OUTPUT DEVICE TO A USER

(71) Applicant: Essilor International, Charenton-le-Pont (FR)

(72) Inventors: Jean-Luc Perrin, Charenton-le-Pont (FR); Damien Paille, Charenton-le-Pont (FR); Bernard Bourdoncle, Charenton-le-Pont (FR); Eric Perrier, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/538,895

(22) PCT Filed: Dec. 18, 2015

(86) PCT No.: PCT/EP2015/080394
§ 371 (c)(1),
(2) Date: Jun. 22, 2017

(87) PCT Pub. No.: WO2016/102340
PCT Pub. Date: Jun. 30, 2016

(65) Prior Publication Data
US 2017/0351328 A1     Dec. 7, 2017

(30) Foreign Application Priority Data

Dec. 22, 2014   (EP) .................................... 14307123

(51) Int. Cl.
*G09G 5/00*  (2006.01)
*G06F 3/01*  (2006.01)
(Continued)

(52) U.S. Cl.
CPC ........... *G06F 3/013* (2013.01); *G02B 27/017* (2013.01); *G02B 27/0172* (2013.01);
(Continued)

(58) Field of Classification Search
CPC ....................................................... G06T 11/00
See application file for complete search history.

(56) References Cited

U.S. PATENT DOCUMENTS

2002/0004415 A1    4/2002  Abbott et al.
2002/0044152 A1*   4/2002  Abbott, III ............. G06T 11/00
                                                          345/629
(Continued)

FOREIGN PATENT DOCUMENTS

WO          2014174067 A1    10/2014

OTHER PUBLICATIONS

ISR/WO for International Appln. No. PCT/EP2015080394; mailed Feb. 22, 2016.

*Primary Examiner* — Thomas J Lett
(74) *Attorney, Agent, or Firm* — Oblon, McClelland, Maier & Neustadt, L.L.P.

(57) ABSTRACT

A method, implemented by computer means, for adapting the sensorial output mode of a sensorial output device, for example a head mounted sensorial output device, to a user of the sensorial output device, the method comprising: a user attentional availability data providing step, during which user attentional availability data indicative of the attentional availability of the user are provided, a user sensorial perception threshold determining step during which a sensorial perception threshold of the user is determined based on the user attentional availability data, and an sensorial output mode adapting step during which the sensorial output mode of the output device is adapted based on the user attentional availability data and the user sensory perception threshold.

20 Claims, 2 Drawing Sheets

(51) Int. Cl.
    *G02B 27/01*     (2006.01)
    *G09G 5/10*     (2006.01)
    *G06F 3/0484*     (2013.01)

(52) U.S. Cl.
    CPC ............... *G06F 3/011* (2013.01); *G09G 5/00* (2013.01); *G09G 5/10* (2013.01); *G02B 2027/014* (2013.01); *G02B 2027/0138* (2013.01); *G06F 3/04847* (2013.01); *G09G 2320/066* (2013.01); *G09G 2320/0686* (2013.01); *G09G 2340/10* (2013.01); *G09G 2340/14* (2013.01); *G09G 2354/00* (2013.01); *G09G 2360/144* (2013.01)

(56) References Cited

U.S. PATENT DOCUMENTS

| | | |
|---|---|---|
| 2009/0040233 A1 | 2/2009 | Yamamoto |
| 2013/0088507 A1 | 4/2013 | White |
| 2014/0096076 A1 | 4/2014 | Ashbrook et al. |

\* cited by examiner

METHOD FOR ADAPTING THE SENSORIAL OUTPUT MODE OF A SENSORIAL OUTPUT DEVICE TO A USER

FIELD OF THE INVENTION

The invention relates to a method, implemented by computer means, for adapting the sensorial output mode of a sensorial output device to a user of the device, a system for outputting information and a computer program product comprising stored instructions which when executed by a processor causes the processor to carry out the method of the invention.

BACKGROUND OF THE INVENTION

Current display devices display information to the user in a way that can disrupt the user or otherwise not be seen by the user, depending on the user's activity, level of attention or sensitivity.

For example, in a driving situation, an unsuitable display may cause a safety hazard because the user's attention focuses on the displayed information and not on the driving.

Otherwise, when the user is concentrated on a recreational activity and wishes to be alerted by the display device, for example by receiving an SMS or an e-mail, the device is required to generate information that is collected in some way by the holder despite his attention to his recreational activity.

The above elements apply more generally to sensorial output devices such as audio and/or visual output devices.

One object of the present invention is to provide a method that allows adapting the sensorial output mode of a sensorial output device, in particular the level of saliency of the output information, according to the need of the user.

SUMMARY OF THE INVENTION

To this end, the invention proposes a method, for example implemented by computer means, for adapting the sensorial output mode of a sensorial output device, for example a head mounted sensorial output device, to a user of the sensorial output device, the method comprising:

- a user attentional availability data providing step, during which user attentional availability data indicative of the attentional availability of the user are provided,
- a user sensorial perception threshold determining step during which a sensorial perception threshold of the user is determined based on the user attentional availability data,
- a sensorial output mode adapting step during which the sensorial output mode of the output device is adapted based on the user attentional availability data and the user sensory perception threshold.

Advantageously, the method according to the invention allows adapting the sensorial output mode of the sensorial output device to the user attentional availability and the user sensory perception threshold. For example, the method according to the invention allows adapting the sensorial output mode the activity carried out by the user.

For example, if the user is driving his level of attentional availability is low and his sensorial perception threshold is high, the sensorial output mode may be adapted so as to reduce the risk of having the output information interfere with the user's driving.

Alternatively, if the information to be output to the user is an alert, for example an alert concerning a risk of collision, the sensorial output mode may be adapted so as to make sure the user actually notice the output information, i.e. the sensorial output mode is adapted so that the output information is above the sensorial perception threshold of the user.

Furthermore, if the user is carrying out a recreational activity his level of attentional availability may be high and his sensorial perception threshold low, the sensorial output mode may be adapted so as to ensure that the user does not miss an output information.

According to further embodiments which can be considered alone or in combination:

the method further comprising an activity data providing step during which an activity data indicative of the activity carried out by the user are provided and wherein during the user sensorial perception threshold determining step the sensorial perception threshold of the user is determined further based on the activity data, and/or during the sensorial output mode adapting step the sensorial output mode of the output device is adapted further based on the activity data; and/or the method further comprising an information data providing step during which information data indicative of the information to be output to the user are provided and wherein during the sensorial output mode adapting step the sensorial output mode of the output device is adapted so that the sensorial output is either above or below the sensorial perception threshold based on the information data; and/or the user attentional availability data comprises an acceptable attentional disengagement parameter indicative of the acceptable attentional disengagement of the user; and/or the acceptable attentional disengagement parameter is determined in response to at least context data indicative of the context of use of the sensorial output device; and/or the acceptable attentional disengagement parameter is determined in response to at least an input data from the user; and/or the user attentional availability data comprises a current attention data indicative of the current attention of the user; and/or the user attentional availability data are compared to a threshold parameter in order to adapt the sensorial output mode to the user attention data; and/or the user attentional availability data is indicative of at least the visual attention of the user; and/or the sensorial output is a visual output and the sensorial output device is a display device whose display mode is adapted during the sensorial output mode adapting step; and/or the display device is an augmented reality display device providing to the user virtual information in addition to a view of the real-world environment; and/or depending on the display mode of the display device the visual contrast within the displayed information is adapted; and/or depending on the display mode of the display device the visual contrast between the displayed information and the real-world environment is adapted; and/or depending on the display mode of the display device at least one parameter selected in the list consisting of the dynamic of the displayed information, the level of detail of the content of the displayed information, the position of the displayed information on the display device, and the size of the displayed information, is adapted; and/or the sensorial output is an audio output and the sensorial output device comprises an audio output whose audio mode is adapted during the sensorial output mode adapting step; and/or depending on the audio output mode the frequency and/or intensity and/or the duration of the audio output is adapted.

The invention also relates to a system for outputting information comprising:

a sensorial output device configured to output sensorial information to a user according to different sensorial output modes, a communication unit configured to receive user attentional availability data indicative of the attentional availability of the user, a memory storing computer executable instructions, a processor for executing the computer executable instructions, wherein the computer executable instructions comprises instructions for:

determining a sensorial perception threshold of the user based on the user attentional availability data, and adapting the sensorial output mode of the sensorial output device based on the on the user attentional availability data and the user sensory perception threshold.

According to further embodiments which can be considered alone or in combination:

the computer executable instructions further comprises instructions for adapting the output mode in response to the received user attentional availability data; and/or the output device is a display device and the processor is further configured to adapt the display mode so that the displayed information is progressively displayed or un-displayed; and/or the display is a see-trough display and/or the system is a head mounted display system.

The invention also relates to a method, for example implemented by computer means, for adapting the display mode of a display device, for example a head mounted display device, to a user of the display device, the method comprising:

a user attentional availability data providing step, during which user attentional availability data indicative of the attentional availability of the user are provided, a display mode adapting step during which the display mode of the display device is adapted in response to the user attentional availability data.

According to further embodiments which can be considered alone or in combination:

the user attentional availability data comprises an acceptable attentional disengagement parameter indicative of the acceptable attentional disengagement of the user; and/or the acceptable attentional disengagement parameter is determined in response to at least context data indicative of the context of use of the display device; and/or the acceptable attentional disengagement parameter is determined in response to at least an input data from the user; and/or the user attentional availability data comprises a current attention data indicative of the current attention of the user; and/or the user attentional availability data are compared to a threshold parameter in order to adapt the display mode to the user attention data; and/or the user attentional availability data is indicative of at least the visual attention of the user; and/or the display device is an augmented reality display device providing to the user virtual information in addition to a view of the real-world environment; and/or depending on the display mode of the display device the visual contrast within the displayed information is adapted; and/or depending on the display mode of the display device the visual contrast between the displayed information and the real-world environment is adapted; and/or depending on the display mode of the display device at least one parameter selected in the list consisting of the dynamic of the displayed information, the level of detail of the content of the displayed information, the position of the displayed information on the display device, and the size of the displayed information, is adapted.

The invention also relates to a system for displaying information comprising:

a display configured to display information to a user according to different display modes, a communication unit configured to receive user attentional availability data indicative of the attentional availability of the user, a processor configured to adapt the display of the information to a specific display mode.

The processor of the display system according to the invention may be configured to adapt the display mode so that the displayed information is progressively displayed or un-displayed.

The processor of the display system according to the invention, may be configured to adapt the display mode in response to the received user attentional availability data.

The display of the system according to the invention may be a see-trough display and/or the system is a head mounted system.

The invention further relates to a computer program product comprising one or more stored sequences of instructions that are accessible to a processor and which, when executed by the processor, causes the processor to carry out the steps of the methods according to the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which:

FIG. 1 is flowchart representing the steps of a method according to an embodiment of the invention.

DETAILED DESCRIPTION OF PREFERRED EMBODIMENTS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

Figure 1:
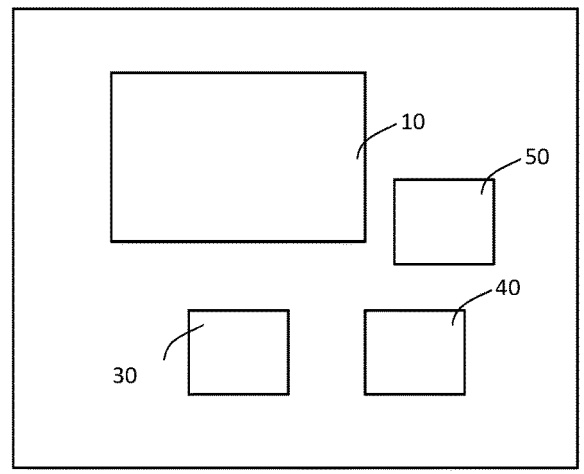
FIG. 1 is a schematic representation of a system for outputting information according to the invention.

As represented on FIG. 1, the invention relates to system for outputting sensorial information, in particular visual information, that comprises at least a output device, for example a display 10, a communication unit 30, a memory 50 and a processor 40.

The output device 10 is configured to output information, for example visual information, to a user of the system. The output device 10 may be configured to display information based on different display modes.

The communication unit 30 is configured to receive user attentional availability data indicative of the attentional availability of the user of the system.

The memory 50 stores computer executable information and may store data.

The processor 40 is configured to execute the computer executable instructions stored in the memory 50.

The computer executable instructions comprise instructions for:

determining a sensorial perception threshold of the user based on the user attentional availability data, and adapting the sensorial output mode of the sensorial output device based on the on the user attentional availability data and the user sensory perception threshold.

According to an embodiment of the invention the system for outputting information may be adapted to display information. The system may be for example a see-through display system.

For example, the computer executable instruction may be configured to adapt the display mode of the display so that the displayed information is progressively displayed or un-displayed.

Figure 2:
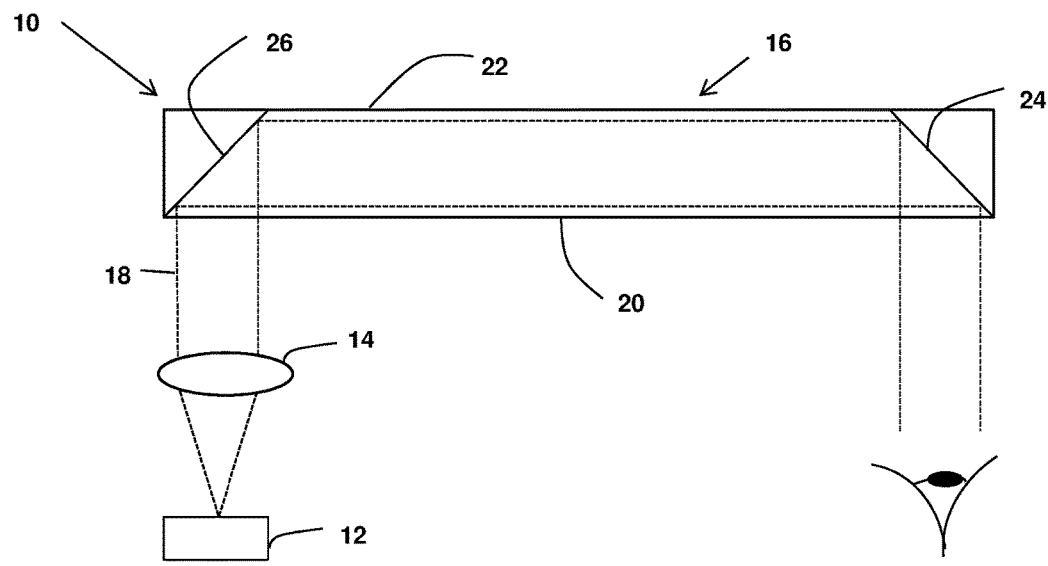
FIG. 2 is a schematic view of a see-trough electro-optical system.

An example of see-trough display system is illustrated in FIG. 2. Such see-trough display system 10 comprises a display source 12, a collimating device 14, and an optical insert 16 constituted by a light-guide optical element 16.

Such see-trough display system 10 allows a two-dimensional image source to be imaged to infinity or not and reflected into the eye of the user.

The display source 12 can be emissive or not emissive.

It can be directly obtained from either a spatial light modulator (SLM) such as a cathode ray tube (CRT), a liquid crystal display (LCD), an organic light emitting diode array (OLED), a scanning source, liquid crystal on silicon (LCoS) or similar devices, or indirectly, by means of a relay lens or an optical fiber bundle. The display source 12 comprises an array of elements (pixels) imaged to infinity by the collimating device 14, for example a collimating lens.

The light-guide optical element 16 typically includes at least two major surfaces 20 and 22 and edges, at least one partially reflecting surface 24 and an optical element 26 for coupling light there into. The output waves 18 from the collimating device 14 enter the light-guide optical element 16 through its lower surface 20. The incoming waves (towards the light-guide optical element) are reflected from the surface 26 and trapped in the light-guide optical element 16.

The collimating device 14 can easily be integrated into a single mechanical module which may be assembled independently of the light-guide optical element 16, with fairly relaxed mechanical tolerances.

The see-trough display system 10 may be a display system arranged to display information over the real world view. For example, the display system is arranged to display computer generated information over the real world view, thus allowing realizing augmented reality device.

With such augmented reality device the viewer's image of the world is augmented with overlaying information.

According to an embodiment of the invention the system for outputting information according to the invention may be a head mounted device, for example an head mounted display device.

Figure 3:
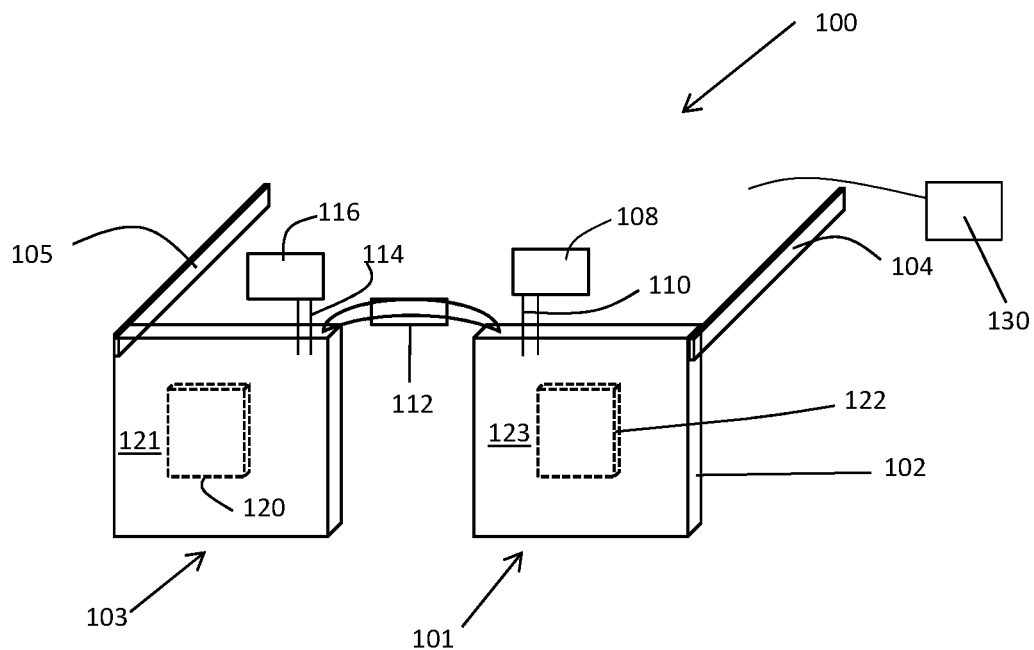
FIG. 3 represents a head mounted electro-optical device according to an embodiment of the invention, and FIG. 4

Head-mounted devices (HMD) are to be worn on or about the head of a wearer. They may include optical means for displaying an image for visualization by the wearer. The HMD may be monocular (single eye) or binocular (both eyes). The HMD of the invention can take various forms, including eyeglasses, masks such as skiing or diving masks, goggles, etc. The HMD may comprise one or more lenses. Said lenses can be selected from prescription lenses. In preferred embodiments, the HMD is a pair of eyeglasses provided with lenses. An example of head mounted device is illustrated on FIG. 3.

In this example, a frame similar to a conventional eyeglasses frame can be worn with a similar comfort level by a wearer. However, other implementations are possible, such as a face shield which is mounted to the user's head by a helmet, strap or other means. The frame includes a frame front 102 and temples 104 and 105. The frame front holds a see-through lens 101 for the user's left eye and a see-through lens 103 for the user's right eye. The left and right orientations are from the user's perspective.

The left-side see-through lens 101 includes a light-transmissive optical component 122 such as a beam splitter which mixes an augmented reality image with light from the real-world scene for viewing by the left eye.

The right-side see-through lens 103 includes an optical component 120 such as a beam splitter which mixes an augmented reality image with light from the real-world scene for viewing by the right eye.

A right-side augmented reality emitter 116 is mounted to the frame via an arm 114, and a left-side augmented reality emitter 108 is mounted to the frame via an arm 110.

The head mounted device may comprise a scene camera 112 adapted to acquire images for the real-world scene facing the wearer.

An electrical power source 130, for example a battery provides power to the different elements of the head mounted device.

Appropriate electrical connections can be made via conductive paths in the frame, for instance.

The head mounted device according to the invention may comprise audio output means allowing to output sound to the user.

Figure 4:
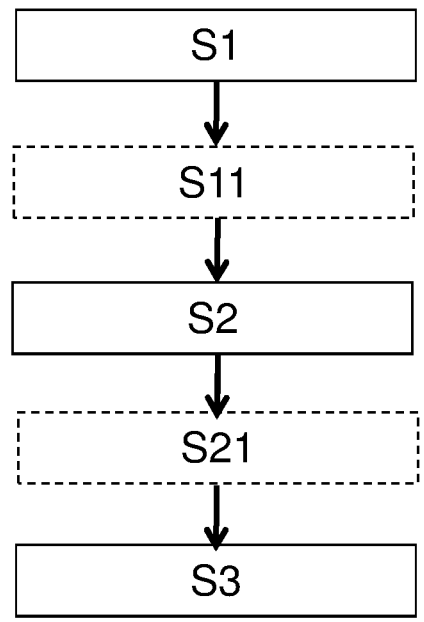

Typically, the sensorial output mode of a system of the invention is adapted by implementing a method as illustrated on FIG. 4. The method according to the invention may be implemented by computer means, typically the communication unit and the processor.

As illustrated on FIG. 4, the method according to the invention comprises:
- a user attentional availability data providing step S1,
- a user sensorial perception threshold determining step S2 and
- a display mode adapting step S3.

During the user attentional availability data providing step user attentional availability data indicative of the attentional availability of the user are provided.

Typically, the attentional availability of the user relates to the possibility for the user at a given time to withdraw his attention of his current activity without suffering discomfort or hazard.

According to an aspect of the invention, the attentional availability of the user comprises an acceptable attentional disengagement parameter indicative of the acceptable level of attentional disengagement of the user.

According to different embodiments of the invention, the acceptable level of attentional disengagement of the user may be either determined in response to at least a context data indicative of the context of the use of the display device. Typically, the context data relates to the type of activity carried out by the user, for example, driving, walking, reading, performing surgery, watching TV, eating etc. . . .

The context data may be either determined using sensors that measure different parameters that may be used to determine the type of activity carried out by the user.

A speed sensor, using for example a GPS system, may determine the speed at which the user is moving. If the speed is high, for example greater than 30 km/h and the GPS coordinate corresponds to a road, the system deduces that the user is in a driving situation. Such context information may be used to determine that the acceptable level of attentional disengagement is low. Indeed, when the user is driving his need a great level of attention on his current activity and his attention should not be disengaged from his current activity.

An image processing system including a camera filming the scene facing the user may be used to determine context data. Typically, from the features of the scene (open environment, the presence of obstacles, the presence of written characters, the user is face to face with another person . . . ), the system may determine context data that may be used to determine the acceptable level of attentional disengagement A light sensor may be used to provide context data. Typically, a light sensor may be used to determine the brightness of the environment. Such context data may be used to determine an acceptable level of attentional disengagement, for example if the user is driving and the light sensor determines that the light is low, the system may determine that the user is driving by night and that driving requires an very high level of attention.

In addition or alternatively to the context data, the acceptable attentional disengagement parameter may be determined in response to an input data from the user.

For example, the user selects via a button an acceptable level of attentional disengagement.

Pressing a button can be replaced with "eye control": the user stares at a portion of the display for a given time, for example two seconds, to set an acceptable level of attentional disengagement. An integrated eye tracker system may detect the user's behavior and determine an acceptable level of attentional disengagement.

According to an embodiment of the invention, the user attentional availability data comprises a current attention data indicative of the current attention of the user.

The current attention of the user may be determined based on the withdrawal capacity of the user. For example, if the user responds within a short time to solicitations, it is considered that his current attention level towards his environment is small. Instead, if the user has a high response time, it may be considered that his current level of attentional towards his environment is high. For example, if the user takes more than 3 seconds to respond to the solicitation of the system, it may be considered that the attentional level is high (Kim and Rieh 2005), such time may be customized based on the user and/or his environment and/or activity.

The current attention of the user may be determined based on physiological markers. For example, the heart rate of the user may be considered. The current level of attention of the user towards his environment may be linked to the difference between his current heart beat and his average heart beat. For example, if the heart beat is at least 15 beats per minute over average, one may consider that the level of attention of the user is high (Dehais et al 2012), such level of difference may be customized based on the user and/or his environment and/or activity.

The current attention of the user may be determined based on brain markers. Using near infrared spectroscopy (NIRS Near Infrared Spectroscopy) the ratio of deoxygenated hemoglobin level over the oxygenated hemoglobin (rSO2) level may provide an indication of the current level of attention of the user. For example, if the ratio deoxygenated hemoglobin level over the oxygenated hemoglobin (rSO2) is less than 70%, one may consider that the level of attention of the user is high (see Braasch 2010), such level of difference may be customized based on the user and/or his environment and/or activity.

The current attention of the user may be determined using an eye tracker device.

Typically, the eye tracker device may be used to determine the pupillary diameter of the user. Knowing the usual pupil diameter of the user, one may determine variation of this diameter. If the diameter increases, one may consider that the attentional level of the user is high. If the diameter remains at its usual level, one may consider that the attentional level of the user is low. For example an increase of more than 1 mm may be considered as an indication of high level of attention (Hossain and Yeasin 2014), such level of increase may be customized based on the user and/or his environment and/or activity.

The eye tracker device may be used to determine the blinking frequency of the user. If the blinking frequency drops it may be an indication that the current attention of the user increases. For example a blinking frequency of less than 17 blinks per minute may be considered as an indication of high attentional level (Benedetto et al 2011), such frequency may be customized based on the user and/or his environment and/or activity.

The eye tracker device may be used to determine the gaze direction of the user. For example the eye tracking device may be used to determine if the user has ambient or focal eye movement (Follet Le Meur Baccino 2011). If the user performs focal movement, i.e. he is focused on details of his visual environment, one may consider that his current level of attention is high. If the user has ambient movements, i.e. the user does not focus on only one given area of the environment, but switches regularly between different areas, one may consider that his current level of attention is low.

As indicated in the previous examples, the user attentional availability data may be compared to a threshold parameter in order to determine the attentional availability of the user.

During the user sensorial perception threshold determining step S2, a sensorial perception threshold of the user is determined based on the user attentional availability data.

For a given sensory stimuli, depending on the level of attentional availability a user may sense the stimuli or not. For example, when a user is fully concentrated on his activity and has a low attentional availability he may not sense a visual or audio stimuli that he would have sense if he was carrying out an activity requiring less concentration.

The sensorial perception threshold depends on the user attentional availability. The sensorial perception threshold may also be user dependent. In other words, different users may have different sensorial perception threshold although having similar attentional availability.

The sensorial perception threshold may be expressed in frequency of the stimuli and/or intensity.

The sensorial perception threshold may also be impacted by the fact of combining different type of stimulus, for example by combining visual and audio stimulus.

For example, the average sensorial perception threshold for visual contrast in low attentional availability (lum_min/lum_max) is 1.56%, the standard deviation of the log value is 0.12, so the average population is within a interval of 0.33% to 7.21%. In other words, there are individual differences.

The sensorial perception threshold for audio stimulation depends on several parameters: the length of the sound (ms), frequency (Hz) and maximum volume (decibels). For example, the detection thresholds can be between 4.5 and 26.5 dB for people not suffering from hearing problem. So there is individual variation in the threshold.

The determination of the sensorial perception threshold of a user may be performed by the user himself, which (re-)sets the sensorial output mode, for example display values, to be satisfied with the levels presented during use.

A set of customized sensorial perception thresholds can be determined at the time of delivery of the equipment. The user is required to perform a task that is associated with a high attentional level and different stimuli are output at different levels (contrast, rate of appearance, size . . . ), when the user detects the stimulus corresponds to the sensorial perception threshold associated with the level of attention. A plurality of measurements can be performed so as to set a data base of customized sensorial perception threshold depending on the level of attentional availability of the user.

The customization of the sensorial perception threshold can be made by machine learning: same principle as the previous solution, except that the detection function is learned as and using a measurement system, for example by measuring the interaction of the user with the system, and the system adjusts the value of the sensorial perception threshold continuously. The latter proposal has the advantage of being able to adapt to the learning potential of the user. Indeed, detection capabilities may vary with the user's habits.

During the sensorial output adapting step S3, the output mode of the sensorial output device is adapted in response to the user attentional availability data and to the user sensory perception threshold.

As illustrated on FIG. 4, the method of the invention may further comprise an activity data providing step S11 during which an activity data indicative of the activity carried out by the user are provided.

When determining the user sensorial perception threshold, the activity data may be considered so as to adjust the user sensorial perception threshold based on the activity carried out by the user. Typically, if the activity data indicate an activity requiring a great level of concentration, such indication may be considered when determining the user sensorial perception threshold.

Furthermore, during the sensorial output mode adapting step the sensorial output mode of the output device may be adapted further based on the activity data.

Typically, if the activity is an indoor or outdoor activity the display may be adapted or if the activity is in a noisy environment the audio output may be adapted.

As illustrated on FIG. 4, the method may further comprise an information data providing step S21 during which information data indicative of the information to be output to the user are provided.

During the sensorial output mode adapting step the sensorial output mode of the output device is adapted so that the sensorial output is either above or below the sensorial perception threshold based on the information data.

In other words, depending on the type of information to be output to the user the sensorial output mode may be adapted.

Advantageously, if the information is an alert, for example alerting of the risk of collision, the output information is preferably above the sensorial perception threshold of the user.

However, it may be of interest to output sensorial information to the user below the sensorial perception threshold of the user.

For example, when outputting a stimulus under the user's perception threshold, it can be considered as a "primer". A primer is a stimulus output so as to not be perceived consciously by the user but in order to influence the processing by the user of the next stimulus. A primer allows improving the processing of the next stimulus, for example faster and/or with less error.

A first type of primer is the repetition priming: it displays the primer not consciously, the latter being the same as the final stimulus.

For example, the system receives information that an email has arrived. The user is currently conducting a complex activity, his level of attention is high and he should not be disturbed. An icon representing the reception of an email is displayed in an unattractive display mode, for example very low contrast icon in relation to the outside. The user continues its activity. Once it is completed, the attention level decreases, and the display may display the information above the sensorial perception threshold of the user, high contrast. The user is then able to more quickly detect the presence of the icon with the primer.

A second type of primer is the "Associative priming" where the primer is different from the stimulus, but is semantically connected thereto.

For example, the system displays a notification about a meeting that is to start in 10 minutes, but the user is currently conducting a complex activity. The system displays an icon representing the family of the event (meeting, represented by an icon with little detail) in a mode below the sensorial perception threshold of the user. When the user has finished its activity, and is again available, the display changes to a display mode greater than the sensorial perception threshold of the user and instead of displaying a simple pictogram, details of the meeting appears in text form (time, place of the meeting, participants, etc.). The user is prepared to receive information about a meeting before they are posted.

This type of primer can be used in a more specific way if the system knows information regarding the task performed by the user.

For example, the user is currently conducting a repair on a machine, and the system integrates technical assistance. The user must perform two tasks to repair the machine the left side repair then repair the right side. The user is in the process of repairing the left side, the system outputs over the sensorial perception threshold of the user technical assistance on the left. But to prepare the user to achieve a result, the system outputs below the sensorial perception threshold of the user data symbolizing the next task, that is to say, the compensation of the right part of the machine. Once the user has completed the first task, can be detected by a particular change in the level of attention of the holder, the output on that task stops, and the output level corresponding to the second task changes to greater than the sensorial perception threshold of the user. The user is prepared to perform the second task.

Such "primer" may also be used to increase reading and/or comprehension of a text. The system may analyze the words to be read and output stimulus below the sensorial perception threshold of the user so as to help the user in his reading task.

According to an embodiment of the invention, the sensorial output is a visual output and the sensorial output device is a display device whose display mode is adapted during the sensorial output mode adapting step.

For example, depending on the display mode of the display device the visual contrast within the displayed information is adapted.

Typically, if the user's acceptable level of attentional disengagement is high, for example because the user is carrying out activity that may be interrupted, or if the user has set his attentional availability parameter to high, the display device may display an alert information with a high level of contrast compared to the other displayed information.

The level of contrast of the display device may be defined by the following formula:

$$\text{Level } C = (L\max - L\min)/L\min,$$

With

Level C the level of contrast of the display device,

Lmax the greatest value of luminance of the display device, and

Lmin the smallest value of luminance of the display device.

On the contrary, if the user's acceptable level of attentional disengagement is low, for example because the user is carrying out activity that should not be interrupted, or if the user has set his attentional availability parameter to low, the display device may display an alert information with a low level of contrast compared to the other displayed information.

According to an embodiment of the invention, depending on the display mode of the display device the visual contrast between the displayed information and the real-world environment is adapted.

Typically, if the user's acceptable level of attentional disengagement is high, for example because the user is carrying out activity that may be interrupted, or if the user has set his attentional availability to high, the display device may display an alert information with a high level of contrast compared to the real-world environment.

On the contrary, if the user's acceptable level of attentional disengagement is low, for example because the user is carrying out activity that should not be interrupted, or if the user has set his attentional availability to low, the display device may display an alert information with a low level of contrast compared to the real-world environment.

Such level of contrast may be defined by the following formula:

$$\text{Level } C = (L \text{ display} - L \text{ environment})/(L \text{ environment}),$$

with

Level C the level of contrast,

L display: the average luminance of the display, and

L environment: the average luminance of the environment.

The level of contrast may also be defined by the following formula:

$$\text{Level } C = (C \text{ display})/(C \text{ environment}),$$

with

Level C the level of contrast,

C display: the contrast of the display device, i.e. (Lmax−Lmin)/Lmin with Lmax the greatest value of luminance of the display device and Lmin the smallest value of luminance of the display device, and C environment: the contrast of the environment, i.e. (Lmax−Lmin)/Lmin with Lmax the greatest value of luminance of the environment and Lmin the smallest value of luminance of the environment.

The display modes may combine the contrast between the displayed information and the contrast compared to the environment.

In particular to get the user's attention, it may be advantageous to have both contrast relative to the displayed information and to the real-world environment high.

On the contrary to assure that the user is not distracted by the displayed information, it may be advantageous to have an alert information with a low contrast relative to the real-world environment and the other displayed information.

According to further embodiments of the invention, depending on the display mode of the display device at least one parameter selected in the list consisting of the dynamic of the displayed information, the level of detail of the content of the displayed information, the position of the displayed information on the display device, and the size of the displayed information, is adapted.

Typically, if the user's acceptable level of attentional disengagement is high, for example because the user is carrying out activity that may be interrupted, or if the user has set his attentional availability to high, the display device may display an alert information in part of the visual field, for example in at least 25% of the visual field so as to assure that the user's does not miss the information.

On the contrary, if the user's acceptable level of attentional disengagement is low, for example because the user is carrying out activity that should not be interrupted, or if the user has set his attentional availability to low, the display device may display an alert information in only a limited part of the visual field, for example less than 10% of the visual filed and preferably in a periphery part of the visual field.

Furthermore, if the user's acceptable level of attentional disengagement is high, for example because the user is carrying out activity that may be interrupted, or if the user has set his attentional availability to high, the display device may display a displayed information with a high dynamic, for example the displayed information appears suddenly in part of the visual field and/or the displayed information has a dynamic movement and/or the displayed information flashes so as to increase the impact of the displayed image on the user.

On the contrary, if the user's acceptable level of attentional disengagement is low, for example because the user is carrying out activity that should not be interrupted, or if the user has set his attentional availability to low, the display device may display a displayed information with a low dynamic, for example the displayed information appears with smooth transition in part of the visual field and/or the displayed information is static and/or the displayed information is stable to as to limit the impact of the displayed image on the attention of the user. For example, the displayed information may be displayed using a smooth transition of about 12 s.

The invention has been described above with the aid of embodiments without limitation of the general inventive concept. In particular it is may be advantageous to combine different type of stimulus for example audio and visual stimulus either to help drax the attention of the user or to act as "primer" to help the user in carrying out specific tasks.

Many further modifications and variations will suggest themselves to those skilled in the art upon making reference to the foregoing illustrative embodiments, which are given by way of example only and which are not intended to limit the scope of the invention, that being determined solely by the appended claims.

The invention claimed is:

1. A method, implemented by a computer, for adapting a sensorial output mode of a sensorial output device to a user of the sensorial output device, the method comprising:
   obtaining, in a user attentional availability data obtaining step, user attentional availability data indicative of the attentional availability of the user;
   determining, in a user sensorial perception threshold determining step, a sensorial perception threshold of the user based on the user attentional availability data; and
   adapting, in a sensorial output mode adapting step, the sensorial output mode of the output device based on the user attentional availability data and the user sensory perception threshold.

2. The method according to claim 1, further comprising an activity data providing step during which activity data indicative of the activity carried out by the user are provided and wherein
   during the user sensorial perception threshold determining step the sensorial perception threshold of the user is determined further based on the activity data, and
   during the sensorial output mode adapting step the sensorial output mode of the output device is adapted further based on the activity data.

3. The method according to claim 1, further comprising an information data providing step during which information data indicative of the information to be output to the user are provided and wherein during the sensorial output mode adapting step the sensorial output mode of the output device is adapted so that the sensorial output is either above or below the sensorial perception threshold based on the information data.

4. The method according to claim 1, wherein the user attentional availability data comprises an acceptable attentional disengagement parameter indicative of an acceptable attentional disengagement of the user.

5. The method according to claim 4, wherein the acceptable attentional disengagement parameter is determined in response to at least context data indicative of a context of use of the sensorial output device.

6. The method according to claim 4, wherein the acceptable attentional disengagement parameter is determined in response to at least an input data from the user.

7. The method according to claim 1, wherein the user attentional availability data comprises a current attention data indicative of a current attention of the user.

8. The method according to claim 1, wherein the user attentional availability data are compared to a threshold parameter in order to adapt the sensorial output mode to the user attention data.

9. The method according to claim 1, wherein the user attentional availability data is indicative of at least a visual attention of the user.

10. The method according to claim 1, wherein the sensorial output is a visual output and the sensorial output device is a display device whose display mode is adapted during the sensorial output mode adapting step.

11. The method according to claim 10, wherein the display device is an augmented reality display device providing to the user virtual information in addition to a view of real-world environment.

12. The method according to claim 10, wherein depending on the display mode of the display device, a visual contrast within displayed information is adapted.

13. The method according to claim 10, wherein depending on the display mode of the display device, a visual contrast between displayed information and real-world environment is adapted.

14. The method according to claim 10, wherein depending on the display mode of the display device, at least one parameter selected in a list including of a dynamic of displayed information, a level of detail of content of the displayed information, a position of the displayed information on the display device, and a size of the displayed information, is adapted.

15. The method according to claim 1, wherein the sensorial output is an audio output and the sensorial output device comprises an audio output whose audio mode is adapted during the sensorial output mode adapting step.

16. The method according to claim 15, wherein depending on an audio output mode, at least one of a frequency, an intensity and a duration of the audio output is adapted.

17. A system for outputting information comprising:
- a sensorial output device configured to output sensorial information to a user according to different sensorial output modes;
- a communication interface configured to receive user attentional availability data indicative of the attentional availability of the user;
- a memory storing computer executable instructions; and
- a processor configured to execute the computer executable instructions, wherein the computer executable instructions comprise instructions for:
  - determining a sensorial perception threshold of the user based on the user attentional availability data; and
  - adapting the sensorial output mode of the sensorial output device based on the user attentional availability data and the user sensory perception threshold.

18. The system according to claim 17, wherein the computer executable instructions further comprise instructions for adapting the output mode in response to the received user attentional availability data.

19. The system according to claim 17, wherein the sensorial output device is a display device and the processor is further configured to adapt a display mode so that displayed information is progressively displayed or un-displayed.

20. The system according to claim 19, wherein the display is a see-through display and the system is a head mounted display system.

\* \* \* \* \*